UNITED STATES PATENT OFFICE.

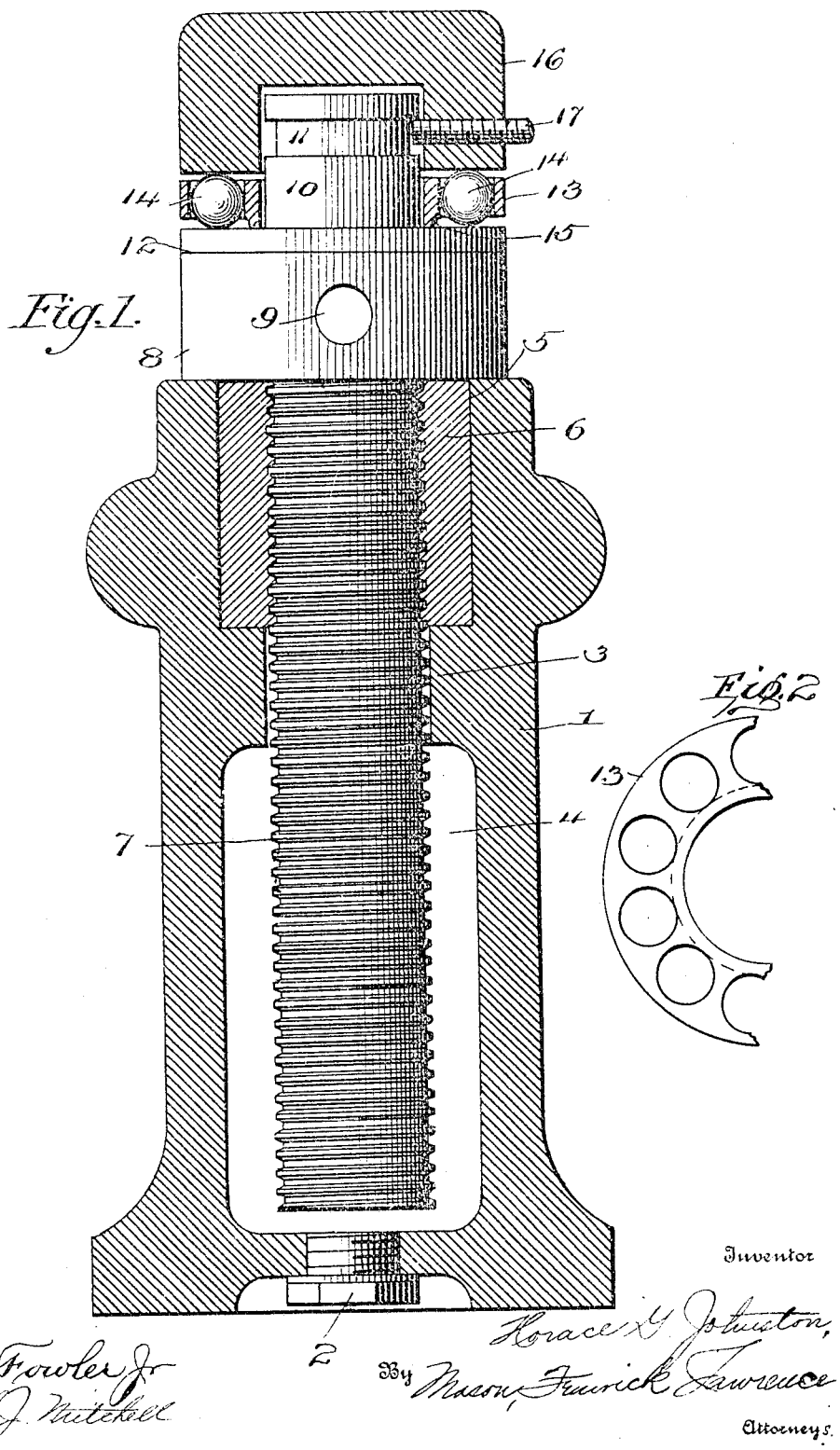

HORACE G. JOHNSTON, OF CORSICANA, TEXAS.

BALL-BEARING JACK.

No. 804,662. Specification of Letters Patent. Patented Nov. 14, 1905.

Application filed May 11, 1905. Serial No. 260,048.

*To all whom it may concern:*

Be it known that I, HORACE G. JOHNSTON, a citizen of the United States, residing at Corsicana, in the county of Navarro and State of Texas, have invented certain new and useful Improvements in Ball-Bearing Jacks; and I do hereby declare the following to be a full, clear, and exact description of the invention, such as will enable others skilled in the art to which it appertains to make and use the same.

This invention relates to improvements in jacks; and the object in view is the provision of a structure susceptible of elevating heavy weights with a minimum amount of wear.

With this and other objects in view the invention comprises certain novel constructions, combinations, and arrangements of parts, as will be hereinafter fully described and fully explained in the accompanying drawings.

Figure 1 represents a longitudinal vertical central section taken through the jack embodying the features of the present invention, parts being in elevation. Fig. 2 represents a detail view of the bearing-retainer.

Referring to the drawings by numerals, 1 indicates a hollow base or stand, the lower end of the stand being closed and an opening being formed in the closure of such end and filled normally by a preferably threaded stopper 2. The interior of the stand 1 is divided by an inwardly-projecting annular flange 3 into a lower chamber 4 and an upper chamber 5. An internally-threaded bushing 6 is arranged within the chamber 5 and rests upon the flange 3, said bushing being fixed in said chamber against rotation, and a threaded shaft or jack-screw is threaded through the bushing 6. When said screw is at the lower extreme of its movement, its lower end is spaced, preferably, only a short distance above the stopper 2. Of course the screw may be of any desired length. The upper end of the screw 7 is formed integrally with or suitably secured to a preferably annular head 8 with the aperture or apertures 9 adapted to receive a rotating tool. Projecting upwardly from the head 8 in axial alinement with the screw 7 is a shaft 10, formed at its upper end with an annular groove 11. An annulus or ring 12, preferably of tool-steel, surrounds the shaft 10 and is supported on the head 8. A bearing-retainer 13 surrounds the shaft 10 above the ring 12, said retainer consisting of a ring formed with a series of apertures, each designed to retain a ball or other suitable antifriction-bearing 14 14, said ring being formed with a depending flange 15, extending downwardly into contact with the upper surface of the ring 12 and positioned for supporting the main portion of the bearing-retainer out of contact with the ring 12. Inclosing the upper end of the shaft 10 is a cap 16, carrying a pin 17, preferably threaded through the side wall of the cap and extending into the groove 11 in position for preventing vertical displacement of the cap while permitting rotation thereof. The lower edge of the depending walls of the cap 6 rests upon the bearings 14, said bearings 14 in turn resting upon the ring 12.

In operation the chamber 4 is filled with oil or other suitable lubricant, and the jack may be placed beneath the object to be elevated and an operating-tool introduced into the aperture 9. The movement of said tool about the jack will of course cause the head 8 to be elevated under the action of the screw 7 until the cap 6 engages the article to be supported and elevates the same to the distance required. Of course it is wholly immaterial whether the jack is placed beneath the object to be elevated or the converse operation occurs, the use of jacks being numerous and varied and well understood in the art. As the head 8 rotates the balls take up friction between the disk 12 and the cap 16. Continued operation of the jack will eventually wear away the upper surface of the ring 12, and as soon as such wearing comes to the extent of lessening the utility of the jack it is only necessary to withdraw the pin 17, remove the cap 16 and the retainer 13, and lifting off the ring 12 invert the same and present the unworn under surface thereof as the upper or new wearing surface. The parts being in place, the parts will be in substantially as good a condition as if a new ring had been inserted.

What I claim is—

1. A jack comprising a stand, a screw engaging the same, a head on said screw, a reversible ring carried by said head, and a cap supported above said ring.

2. A jack comprising a casing, a screw engaging the same, a head for said screw, a reversible ring supported above said head, a cap spaced above said ring, and an antifriction-bearing disposed above said ring.

3. A jack comprising a stand, a screw engaging the same, a head for said screw, a cap spaced above said head, an apertured ring interposed between said head and cap, a supporting-flange depending from said ring, and antifriction-bearings carried in the apertures of said ring in position for supporting said cap.

4. A jack comprising a stand, a screw threaded into the same, a head for said screw, a shaft projecting from said head, a cap surrounding said shaft, an apertured ring surrounding said shaft and interposed between said cap and head, a flange extending from the inner edge of said ring and supporting the same out of contact with the head, and antifriction-bearings arranged in the apertures of said ring.

5. A jack comprising a stand, a screw engaging the same, a head for said screw, a cap spaced from said head, an apertured body interposed between said head and cap, and arranged out of contact with either, and antifriction-bearings arranged in the apertures in said body in position for supporting said cap.

6. A jack comprising a stand, a screw engaging the same, a head for said screw, a shaft projecting from said head, a removable ring surrounding said shaft and supported by said head, a second ring also surrounding said shaft and provided with a depending flange engaging the first-mentioned ring, said second ring being formed with apertures, antifriction-bearings arranged in said apertures in position for resting upon said first-mentioned ring, and a cap resting upon said bearings.

7. A jack, comprising a stand, a screw engaging the same, a head for said screw, a shaft extending vertically from said head, a cap provided with an annular, depending portion positioned upon the upper end of said shaft, an apertured body interposed between said head and the annular, depending portion of said cap and arranged out of contact with either, and antifriction-bearings arranged in the apertures of said body and positioned for supporting said cap.

8. A jack, comprising a stand, a screw engaging the same, a head for said screw, a shaft extending from said head, a cap positioned upon said shaft, a depending extension formed upon said cap and surrounding said shaft, and an antifriction-bearing arranged between the lower edge of said depending extension of the cap and head.

In testimony whereof I affix my signature in presence of two witnesses.

HORACE G. JOHNSTON.

Witnesses:
W. J. CHENEY,
R. N. ELLIOTT.